United States Patent
Hyman et al.

(10) Patent No.: US 8,924,390 B2
(45) Date of Patent: Dec. 30, 2014

(54) PLAYABLE MUSIC LIBRARY BUILDING IN A STREAMING MEDIA ENVIRONMENT

(75) Inventors: David Hyman, Kensington, CA (US); Raphael L. Jacoby, Daly City, CA (US); Andrei M. Marinescu, San Francisco, CA (US)

(73) Assignee: Beats Music, LLC, San Francisco, CA (US)

( * ) Notice: Subject to any disclaimer, the term of this patent is extended or adjusted under 35 U.S.C. 154(b) by 582 days.

(21) Appl. No.: 12/106,269

(22) Filed: Apr. 19, 2008

(65) Prior Publication Data
US 2009/0265369 A1    Oct. 22, 2009

(51) Int. Cl.
*G06F 17/30* (2006.01)
*G06F 7/00* (2006.01)

(52) U.S. Cl.
CPC .... *G06F 17/30029* (2013.01); *G06F 17/30761* (2013.01); *G06F 17/30766* (2013.01); *G06F 17/30058* (2013.01); *G06F 17/30743* (2013.01); *G06F 17/30867* (2013.01); *G06F 17/30772* (2013.01); *G06F 17/30053* (2013.01)
USPC .......... 707/738; 707/726; 715/716; 715/201; 725/28; 725/39; 725/118

(58) Field of Classification Search
None
See application file for complete search history.

(56) References Cited

U.S. PATENT DOCUMENTS

| | | | |
|---|---|---|---|
| 6,526,411 B1 * | 2/2003 | Ward | 1/1 |
| 8,606,684 B2 * | 12/2013 | Bi et al. | 705/37 |
| 2002/0091848 A1 * | 7/2002 | Agresta et al. | 709/231 |
| 2002/0120564 A1 * | 8/2002 | Strietzel | 705/40 |
| 2002/0152278 A1 * | 10/2002 | Pontenzone et al. | 709/217 |
| 2004/0165006 A1 * | 8/2004 | Kirby et al. | 345/740 |
| 2006/0156236 A1 * | 7/2006 | Heller et al. | 715/716 |
| 2006/0168340 A1 * | 7/2006 | Heller et al. | 709/242 |
| 2006/0195512 A1 * | 8/2006 | Rogers et al. | 709/203 |
| 2006/0195521 A1 * | 8/2006 | New et al. | 709/204 |
| 2006/0265421 A1 * | 11/2006 | Ranasinghe et al. | 707/104.1 |
| 2007/0174866 A1 * | 7/2007 | Brown et al. | 725/28 |
| 2007/0250445 A1 * | 10/2007 | Ache | 705/51 |
| 2008/0120308 A1 * | 5/2008 | Martinez et al. | 707/100 |
| 2008/0120501 A1 * | 5/2008 | Jannink et al. | 713/163 |
| 2008/0133593 A1 * | 6/2008 | Clark | 707/104.1 |
| 2008/0140849 A1 * | 6/2008 | Collazo | 709/229 |
| 2008/0162147 A1 * | 7/2008 | Bauer | 704/275 |
| 2008/0189388 A1 * | 8/2008 | Khare et al. | 709/217 |
| 2008/0194276 A1 * | 8/2008 | Lin et al. | 455/466 |
| 2008/0207182 A1 * | 8/2008 | Maharajh et al. | 455/414.1 |
| 2009/0117845 A1 * | 5/2009 | Rao | 455/3.05 |

* cited by examiner

*Primary Examiner* — Dung K Chau
(74) *Attorney, Agent, or Firm* — Novak Druce Connolly Bove + Quigg LLP (57) ABSTRACT

A method, system, and apparatus of a playable music library building in a streaming media environment are disclosed. In one embodiment, a method of a server device includes, creatin a streamable playlist associated with a user, determining that the streamable playlist is associated with an artist, and determining that a central database includes new tracks of the artist, automatically adding the new tracks to the streamable playlist without charging a consideration to the user. The method may include communicating an alert message to the user when the new tracks may be added to the streamable playlist. The method may create a category playlist associated with the user based on a category of a media content. The method may include determining that the central database may include additional tracks in the category. The method may request that the user to add the additional tracks in the category playlist.

17 Claims, 8 Drawing Sheets

| USER 400 | PLAYLIST 406 | NEW ADDED PLAYLIST 406 | DELETED PLAYLIST 408 | INTERESTS 410 | OTHER 412 |
|---|---|---|---|---|---|
| BILL | 3 PLAYLIST | JACKSONS | HARRY | HIKING | MY FAVORITE: RHYTHM DIVINE |
| JANE | 2 PLAYLIST | ENRIQUE | NIL | DANCE | CRAZE ABOUT "DANIEL CRIAG" |
| • | • | • | • | • | • |
| • | • | • | • | • | • |
| • | • | • | • | • | • |

TABLE VIEW 450

PLAYABLE MUSIC LIBRARY BUILDING IN A STREAMING MEDIA ENVIRONMENT

FIELD OF TECHNOLOGY

This disclosure relates generally to an enterprise method, a technical field of communication and, in one example embodiment, to playable music library building in a streaming media environment.

BACKGROUND

A user (e.g., a music fan, a movie patron, a computer gaming patron, an e-book reader) may enjoy a work of authorship of a particular type (e.g., of a particular artist, of a particular category, of a particular genre, etc.). The user may purchase a media content of the particular type (e.g., musical, theatrical, artistic, cultural, hobby, etc.) through a service (e.g., Apple® iTunes, Napster®, Rhapsody®, etc.). The service may charge a monthly subscription fee to the user to download the media content. The service may need to collect revenues to pay an artist, intermediaries, and/or employees of the service. The service may not allow unlimited access to the media content without charging the user a consideration (e.g., monthly fee, per unit download fee, subscription fee, etc.) to access the media content.

The user may not know when new works of authorship of the particular type are available. Furthermore, the user may not be able to afford the new works of authorship of the particular type. As a result, the media collection of the user may be limited to only a partial collection of the particular type of work of authorship of interest to the user.

SUMMARY

A method, system, and apparatus of a playable music library building in a streaming media environment are disclosed. In one aspect, a method of a server device includes, creating a streamable playlist (e.g., the streamable playlist may be created of a media content that may be stored on a content database of a central server) associated with a user, determining that the streamable playlist is associated with an artist, determining that a central database includes new tracks of the artist, and automatically adding the new tracks to the streamable playlist without charging a consideration to the user.

The method may include, communicating an alert message to the user when the new tracks may be added to the streamable playlist. The method may also include, creating a category playlist associated with the user based on a category of a media content. The method may determine that the central database may include additional tracks in the category. The method may request that the user to add the additional tracks in the category playlist. The method may add the additional tracks to the category playlist based on a user response.

The method may also include removing certain ones of the new tracks based on a request of the user. The streamable playlist may not be downloaded to a client device associated with the user before the consideration is received from the user. The streamable playlist may be playable as a ringtone on a mobile device. The streamable playlist may be created when the user may select a subscribe indicator on a website associated with the artist. The subscribe indicator may be located on any website having textual data referencing the artist. The website may be a fan page of the artist, a blog page, and/or an artist website, etc.

The method may include determining that the central database includes related tracks of other artists in a similar geographic area as the artist. In addition, the method may include automatically adding the related tracks to the streamable playlist without charging a consideration to the user. The method may include determining that the central database includes certain tracks of that fit a personality profile of the user of a social community environment. The method may automatically recommend that the certain tracks may be added to the streamable playlist without charging a consideration to the user.

In another aspect, a method of a server device includes determining an attribute desirable to a user of a social community environment based on at least one of an analysis of a profile of the user in the social community environment and a media content of a playlist, and automatically adding tracks to the playlist of the user when additional tracks of a content database of a central server may be determined to share the attribute desirable to the user.

The attribute may be selected from a personal attribute of the user, an artist name, an album name, a track name, a genre, a category, and/or a geographical area etc. The method may include selecting a media content of the playlist from the content database having content of artists and/or media labels based on a request of the user of a social community environment. The method may stream the media content from the central server associated with the central content database to the user without requiring consideration of the user to access the media content.

In yet another aspect, a system includes a central server having a plurality of media content associated with different artists stored in a content database, a server device to create a streamable playlist associated with a user from selected ones of the plurality of media content of the central database and to automatically add new tracks to the streamable playlist without charging a consideration to the user, and a client device to play the streamable playlist having the new tracks without downloading the selected ones of the plurality of media content and the new tracks to the client device.

The system may include a subscribe module of the server device to automatically create a new streamable playlist when the user may select a subscribe indicator associated with an artist, album, a genre, and/or a category in any website where the subscribe indicator may be activated. The system may also include a geography module of the server device to determine that a geo-spatial region may be relevant to the selected ones of the plurality of media content, and to select the new tracks based on the geo-spatial region identified. In addition, the system may include a profile analyzer module of the server device to determine characteristics of a user profile that may indicate which of the new tracks may be desirable to the user.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method, apparatus, and system of playable music library building in a streaming media environment are disclosed. In the following description, for the purposes of explanation, numerous specific details are set forth in order to provide a thorough understanding of the various embodiments. It will be evident, however to one skilled in the art that the various embodiments may be practiced without these specific details.

In one embodiment, the method of server device (e.g., the server device 100 of FIG. 1) includes, creating a streamable playlist associated with a user (e.g., the user 108 of FIG. 1), determining that the streamable playlist is associated with an artist (e.g., Rhythm divine by Enrique, etc.), and determining that a central database includes new tracks of the artist, automatically adding the new tracks (e.g., using the add/remove module 114 of FIG. 1) to the streamable playlist without charging a consideration (e.g., money, etc.) to the user 108.

In another embodiment the method of server device (e.g., the server device 100 of FIG. 1) includes, determining an attribute (e.g., personnel attribute of user, an artist name, an album name, a track name, a genre, etc.) desirable to a user (e.g., the user 108 of FIG. 1) of a social community environment (e.g., the social community environment 120 of FIG. 1) based on at least one of an analysis of a profile (e.g., using the profile analyzer module 204 of FIG. 2) of the user 108 in the social community environment 120 and a media content (e.g., the media content 116 of FIG. 1) of a playlist, and automatically adding tracks to the playlist (e.g., add/remove module 114 of FIG. 1) of the user 108 when additional tracks of a content database (e.g., the content database 118 of FIG. 1) of a central server (e.g., the central server 102 of FIG. 1) may be determined to share the attribute desirable to the user 108.

In yet another aspect, a system includes a central server (e.g., the central server 102 of FIG. 1) having a plurality of media content (e.g., the media content 116 of FIG. 1) associated with different artists stored in a content database (e.g., the content database 118 of FIG. 1), a server device (e.g., the server device 100 of FIG. 1) to create a streamable playlist (e.g., using the create module 206 of FIG. 2) associated with a user (e.g., the user 108 of FIG. 1) from selected ones of the media content of the central database and to automatically add new tracks to the streamable playlist (e.g., the add/remove module 114 of FIG. 1) without charging a consideration (e.g., credit, money, etc.) to the user 108, and a client device (e.g., the client device 106 of FIG. 1) to play the streamable playlist having the new tracks without downloading the selected ones of the plurality of media content and the new tracks to the client device 106.

Figure 1:
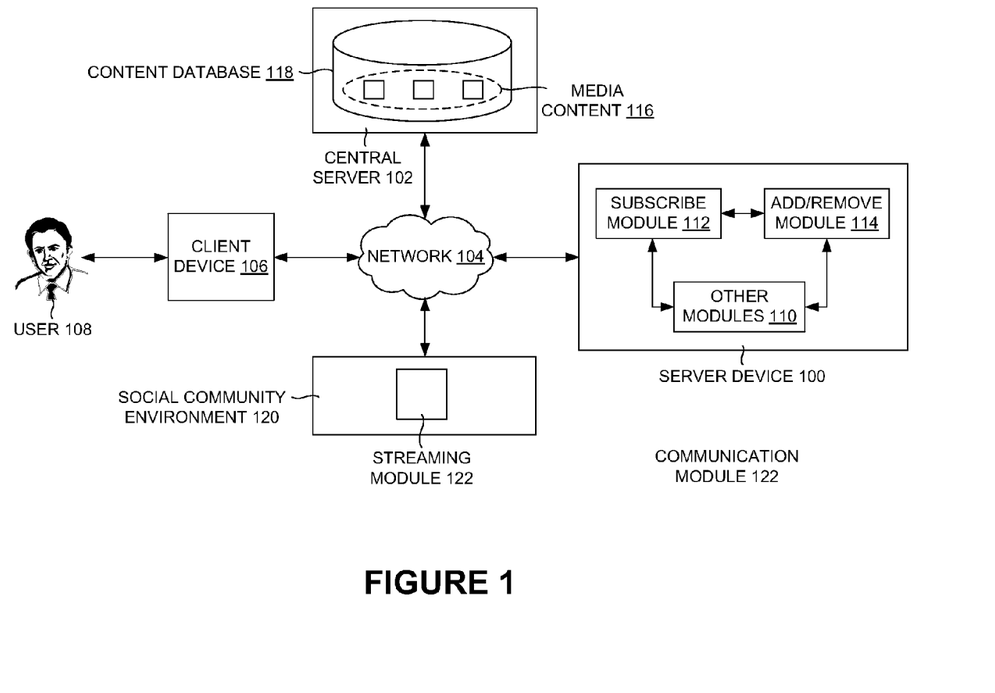
FIG. 1 is a system view of a user accessing a streamable play list from media content of a central server to a client device through a network, according to one embodiment.

FIG. 1 is a system view of a user accessing a streamable play list from media content of a central server to a client device through a network, according to one embodiment. Particularly, FIG. 1 illustrates a server device 100, a central server 102, a network 104, a client device 106, a user 108, other modules 110, a subscribe module 112, an add/remove module 114, a media content 116, a content database 118, a social community environment 120, and streaming module 122, according to one embodiment.

The server device 100 may be a processing device which may provide services (e.g., streaming data, messaging, etc.) required by the client devices. The central server 102 may be an application and/or a device that may perform services (e.g., streaming data, messaging, etc.) to the client devices. The central server 102 may consist of a set of computers that may store applications and/or data files shared by many different people on the network 104 (e.g., an internet, etc.). The network 104 may be a local area network, a wide area network, an internet network etc., where the user 108 may communicate with the central server 102 and the server device 100 for the media content 116 of his/her interest.

The client device 106 may be a data processing system (e.g., computer, laptop, mobile, etc.) which may communicate with the server device 100 for users request on the network 104. The user 108 may be a person, patron etc. who may want to access the media data of his/her interest from the server device 100 through the network 104 (e.g., may be from the internet, etc.). The other modules 110 may be a set of modules that may support additional tasks in the server device 100. The subscribe module 112 may create a new streamable playlist (e.g., Jackson's playlist as illustrated in FIG. 3) when the user 108 selects a subscribe indicator (e.g., the subscribe indicator 310 of FIG. 3) associated with an artist, album, a genre, and/or a category in any website where the subscribe indicator 310 may be activated (e.g., as illustrated in FIG. 3).

Figure 3:
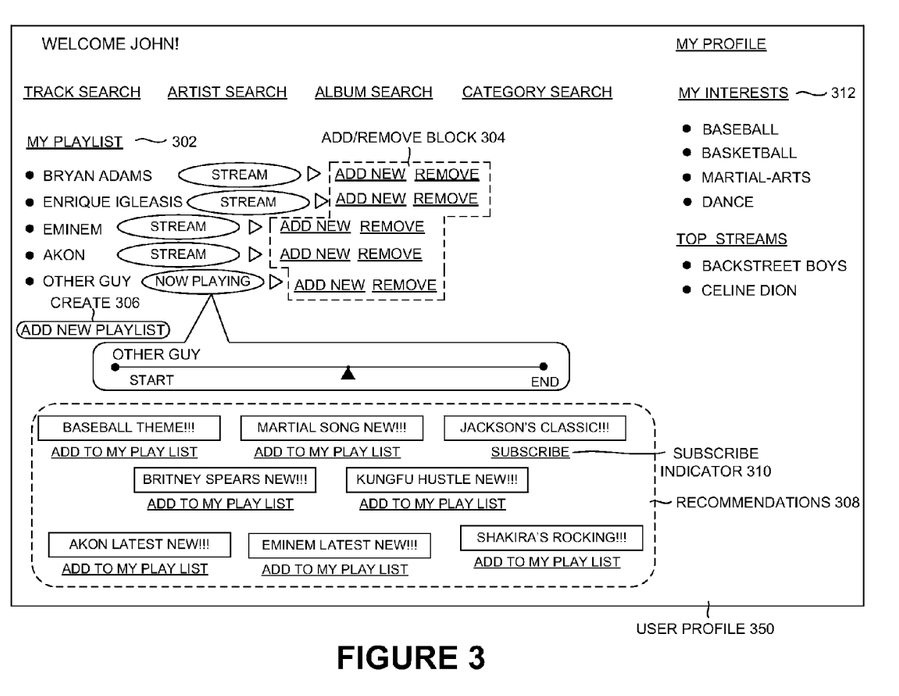
FIG. 3 illustrates a user interface view of user profile, according to one embodiment.

The add/remove module 114 may add additional tracks (e.g., Jackson's, Britney's, Bryan Adams, etc. as illustrated in FIG. 3) to category playlist based on a user response and/or may remove certain tracks based on a request of the user 108. The media content 116 may be an audio, a video, or any multimedia etc that may be streamed or accessed by the user 108. The content database 118 may be collection of content data which may include media data (e.g., audio data, video data, etc.). The social community environment 120 may be an environment in which users share their interests (e.g., common interest in music, videos, etc.) with other users having similar and/or different interests. The streaming module 122 may stream media data (e.g., audio data, video data, etc.) from the central server 102 to the client device 106.

In an example embodiment, the user 108 may select media data (e.g., tracks, movie, etc.) from the streamable playlist (e.g., may be created when the user 108 selects a subscribe indicator using the subscribe module 112) which may be stored in the content database 118 of the central server 102 through the network 104 in the client device 106. The user 108 may communicate with the server device 100 from the client device 106 (e.g., may be using the social community environment 120, etc.) through the network 104. The server device 100 may include the subscribe module 112, the add/remove module 114, and other modules 110.

In one embodiment, the streamable playlist may be created (e.g., using the create module 206 of FIG. 2) of the media content 116 that may be stored on the content database 118 of the central server 102. A category playlist associated with the user 108 may be created based on a category of a media content 116 (e.g., using the create module 206 of FIG. 2). The streamable playlist may not be downloaded to the client device 106 associated with the user 108 before the consideration is received from the user 108. The streamable playlist may be playable as a ring tone on a mobile device.

The media content 116 of the playlist may be selected from the content database 118 having content of artists and/or media labels based on a request (e.g., using the request module 210 of FIG. 2) of the user 108 of the social community environment 120. The media content 116 may be streamed from the central server 102 (e.g., using the streaming module 122 of FIG. 1) associated with the central content database to the user 108 without requiring consideration of the user 108 to access the media content 116.

The central server 102 may have media content associated with different artists (e.g., Jackson, Akon, etc.) stored in the content database 118. The server device 100 may create a streamable playlist associated with the user from selected ones of the media content 116 of the central database and/or to automatically add new tracks (e.g., using the add/remove module 114 of FIG. 1) to the streamable playlist without charging a consideration to the user 108. The client device 106 (e.g., computer, laptop, mobile, etc.) may play the streamable playlist having the new tracks without downloading the selected ones of the media content 116 and/or the new tracks to the client device 106.

Figure 2:
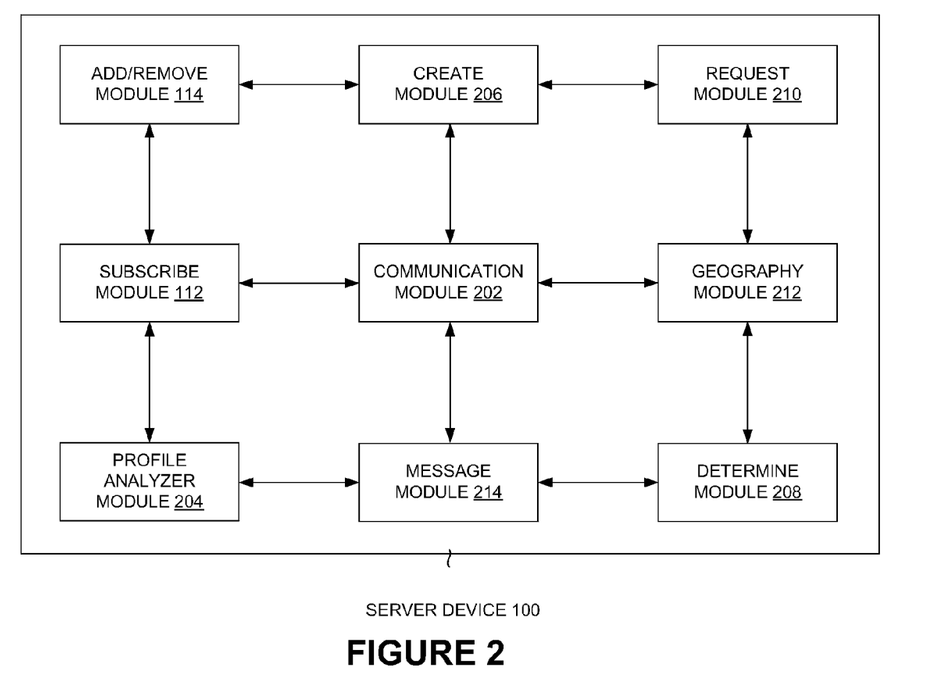
FIG. 2 is an exploded view of server device, illustrated in FIG. 1, according to one embodiment.

FIG. 2 is an exploded view of server device 100 illustrated in FIG. 1, according to one embodiment. Particularly, FIG. 2 illustrates the server device 100, the subscribe module 112, the add/remove module, a communication module 202, a profile analyzer module 204, a create module 206, a determine module 208, a request module 210, a geography module 212, and a message module 214, according to one embodiment.

The communication module 202 may be used to communicate an alert message to the user 108 when new tracks are added to the playlist. The profile analyzer module 204 may determine characteristics of user profile and/or may indicate the new tracks that may be desirable by the user 108 (e.g., as illustrated in FIG. 3). The create module 206 may enable the user 108 to create streamable playlist associated with his/her interest based on the category of the media content 116. The determine module 208 may determine that the streamable playlist may be associated with an artist (e.g., "everybody" with Backstreet Boys, etc.).

The request module 210 may be used by the user 108 for requesting to add additional tracks to the category playlist. The geography module 212 may determine that a geo-spatial region (e.g., Google Earth™, Wikimapia©, etc.) may be relevant to the selected ones of media content and/or may select new tracks based on the geo-spatial region identified. The message module 214 of the server device 100 may be used to communicate an alert message (e.g., an SMS, an email, etc.) to the user 108 when new tracks (e.g., Jackson's, Britney's as illustrated in FIG. 3) are added to the streamable playlist.

In an example embodiment, the communication module 202 may communicate with the subscribe module 112, the add/remove module 114, the profile analyzer module 204, the create module 206, the determine module 208, the request module 210, the geography module 212, and/or the message module 214, according to one embodiment. The other modules 110 of FIG. 1 may include the communication module 202, the profile analyzer module 204, the create module 206, the determine module 208, the request module 210, the geography module 212, and/or the message module 214.

In one embodiment, a streamable playlist associated with the user 108 may be created (e.g., using the create module 206 of FIG. 2). The streamable playlist associated with an artist may be determined (e.g., using the determine module 208 of FIG. 2). New tracks of the artist may be determined in a central database. The new tracks may be automatically added (e.g., using the add/remove module 114 of FIG. 1) to the streamable playlist without charging a consideration to the user 108. An alert message (e.g., using the message module 214 of FIG. 2) may be communicated (e.g., using the communication module 202 of FIG. 2) to the user 108 when the new tracks are added to the streamable playlist.

It may be determined (e.g., using the determine module 208 of FIG. 2) that the central database may include additional tracks in the category. The user 108 may request (e.g., using the request module 210) to add the additional tracks (e.g., using the add/remove module 114) in the category playlist. The additional tracks may be added (e.g., using the add/remove module 114 of FIG. 1) to the category playlist based on a user response.

Certain ones of the tracks may be removed (e.g., using the add/remove module 114) based on a request (e.g., using the request module 210 of FIG. 2) of the user 108. The streamable playlist may be created (e.g., using the create module 206 of FIG. 2) when the user 108 may select a subscribe indicator (e.g., the subscribe indicator 310 of FIG. 3) on a website associated with the artist (e.g., www.schwarzenegger.com, etc.).

It may be determined that the central database may include related tracks of other artists in a similar geographic area (e.g., using geography module of FIG. 2) as the artists. The related tracks may be automatically added (e.g., using the add/remove module 114 of FIG. 2) to the streamable playlist without charging a consideration to the user 108.

It may be determined that the central database may include certain tracks that fit a personality profile of the user 108 of the social community environment 120. The certain tracks may be automatically added (e.g., using the add/remove module 114 of FIG. 1) to the streamable playlist without charging a consideration to the user 108.

An attribute desirable to the user 108 of the social community environment 120 may be determined based on an analysis of the profile (e.g., using the profile analyzer module 204 of FIG. 2) of the user 108 in the social community environment 120 and/or the media content 116 of a playlist. Tracks may be automatically added (e.g., using the add/remove module 114 of FIG. 1) to the playlist of the user 108 when additional tracks of the content database 118 of the central server may be determined to share the attribute desirable to the user 108.

The attribute may be selected from a personal attribute (e.g., interests, etc.) of the user 108, an artist name, an album name, a track name, a genre, a category, and/or a geographical area. The subscribe module 112 of the server device 100 may automatically create a new streamable playlist when the user 108 selects a subscribe indicator 310 associated with an artist, album, a genre, and/or a category in any website where the subscribe indicator 310 may be activated.

The geography module 212 of the server device 100 may determine that a geo-spatial region may be relevant to the selected ones of the media content 116, and may select the new tracks based on the geo-spatial region identified. A profile analyzer module (e.g., the profile analyzer module 204 of FIG. 2) of the server device 100 may determine characteristics of a user profile that indicate which of the new tracks are desirable to the user 108.

FIG. 3 illustrates a user interface view 350 of user profile, according to one embodiment. Particularly, FIG. 3 illustrates "my playlists" block 302, add/remove block 304, a create option 306, recommendations 308, a subscribe indicator 310, and a block 312, according to one embodiment.

The "my playlist" block 302 may be a playlist of media data (e.g., tracks, audio, video, etc.) that may have been created by the user 108. The add/remove block 304 may enable the user 108 to add and/or remove the media data (e.g., tracks, video, multimedia, etc.) from the playlist. The create option 306 may enable the user 108 to create new playlists of his/her interest. The recommendations 308 may encourage the user 108 to add new media data (e.g., playlists, tracks, etc.) to the existing playlist/list of playlists based on the user profile, related media data, media data related to artists in a similar geographic area. The subscribe indicator 310 may encourage the user 108 to subscribe for related media data from a particular site/artist/geographic area, etc. The block 312 may illustrate the personality information of the user 108 for the server device 100 to search for related media content.

In example embodiment, the user interface view 350 may display the profile of John profile along with the current song (e.g., the other guy) being played. The user profile (e.g., John's profile) may include the playlists (e.g., the "my playlists" 302 of FIG. 3), the user interests (e.g., my interests of FIG. 3), the add/remove block 304, the create option 306, the recommendations 308, the subscribe indicator 310, etc. "my playlist" 302 may display Bryan Adams, Enrique Igleasis, Eminem, Akon, and other guy. The block 312 may display "My interest" which may display base ball, basket ball, martial arts, rock songs as his/her interests, top streams such as Backstreet Boys, Celine Dione etc.

In one embodiment, the subscribe indicator 310 may be located on any website having textual data referencing the artist. The website may be a fan page of the artist (e.g., www.arnoldcalls.com/fan_club.htm, etc.), a blog page (e.g., piercebrosnan.skynetblogs.be/), and/or an artist website.

Figure 4:
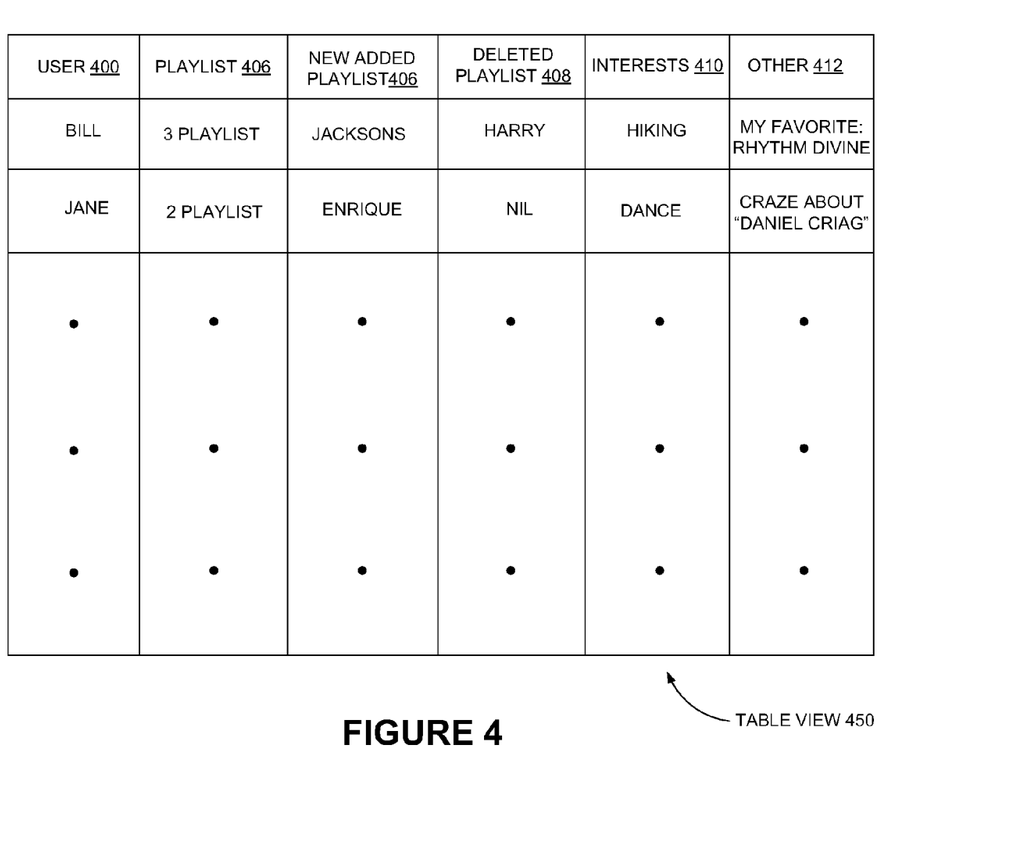
FIG. 4 is a table view illustrating various fields such as user, playlist, new added, deleted, interest, and other, according to one embodiment.

FIG. 4 is a table view illustrating various fields such as user, playlist, new added, deleted, interest etc. according to one embodiment. Particularly, FIG. 4 illustrates a user field 402, a playlist field 404, a new added playlist field 406, a deleted field 408, interests field 410, and other field 412, according to one embodiment.

The user field 402 may illustrate the user 108 (e.g., Jolly, Ryan Lam etc. as illustrated in FIG. 4) who may be accessing the media data (e.g., audio, video, etc.) from the network 104 (e.g., may be using internet, etc.). The playlist field 404 may state the number of playlists the user 108 may be currently having. The new added playlist field 406 may display the newly added playlists by the users. The deleted field 408 may display the playlist that may be deleted by the users. The interests field 410 may display various interests of the particular user. The other field 412 may display other aspects (e.g., favorites, craze, etc.) associated with particular user.

In an example embodiment, the FIG. 4 illustrates various fields according to one embodiment. The user field 402 column may display Jolly in first row and Ryan Lam in second row. The playlist field 404 column may display three playlists and five playlists associated with the user Jolly and Ryan Lam respectively. The new added playlist field 406 may display Jackson for the user Jolly and Enrique for the user Ryan Lam. The deleted 408 column may display Harry to the user Jolly, and nil to the user Ryan Lam. The interests field 410 may display interest such as hiking associated with the user Jolly and interest such as dance associated with the user Ryan Lam. The other field 412 may display "rhythm divine" as favorite song for Jolly and Daniel Craig as craze for Ryan Lam, according to one embodiment.

Figure 5:
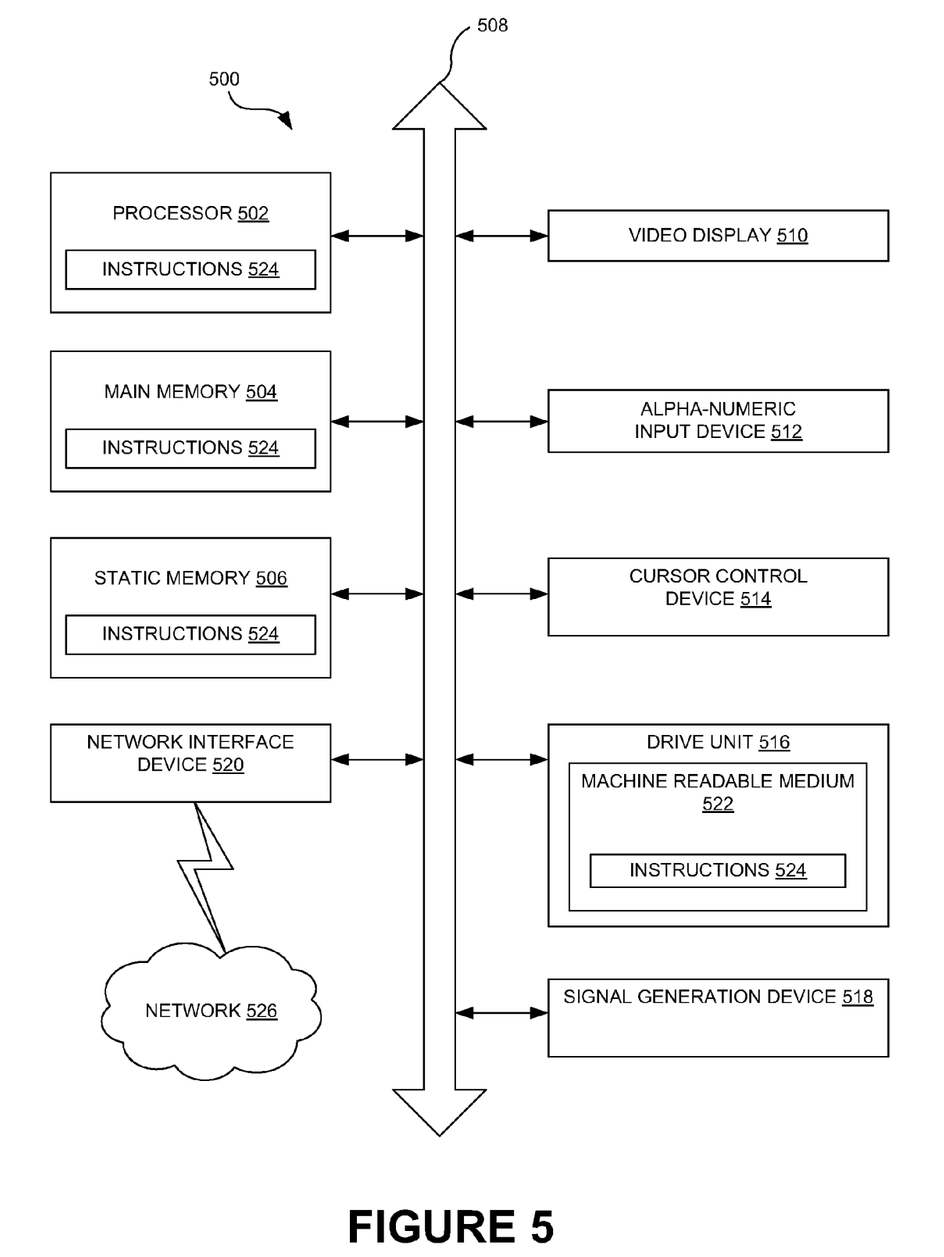
FIG. 5 is a diagrammatic system view of a data processing system in which any of the embodiments disclosed herein may be performed, according to one embodiment, according to one embodiment.

FIG. 5 is a diagrammatic system view 500 of a data processing system in which any of the embodiments disclosed herein may be performed, according to one embodiment. Particularly, the diagrammatic system view 500 of FIG. 5 illustrates a processor 502, a main memory 504, a static memory 506, a bus 508, a video display 510, an alpha-numeric input device 512, a cursor control device 514, a drive unit 516, a signal generation device 518, a network interface device 520, a machine readable medium 522, instructions 524, and a network 526, according to one embodiment.

The diagrammatic system view 500 may indicate a personal computer and/or the data processing system in which one or more operations disclosed herein are performed. The processor 502 may be a microprocessor, a state machine, an application specific integrated circuit, a field programmable gate array, etc. (e.g., Intel® Pentium® processor). The main memory 504 may be a dynamic random access memory and/or a primary memory of a computer system.

The static memory 506 may be a hard drive, a flash drive, and/or other memory information associated with the data processing system. The bus 508 may be an interconnection between various circuits and/or structures of the data processing system. The video display 510 may provide graphical representation of information on the data processing system. The alpha-numeric input device 512 may be a keypad, a keyboard and/or any other input device of text (e.g., a special device to aid the physically handicapped).

The cursor control device 514 may be a pointing device such as a mouse. The drive unit 516 may be the hard drive, a storage system, and/or other longer term storage subsystem. The signal generation device 518 may be a bios and/or a functional operating system of the data processing system. The network interface device 520 may be a device that performs interface functions such as code conversion, protocol conversion and/or buffering required for communication to and from the network 526. The machine readable medium 522 may provide instructions on which any of the methods disclosed herein may be performed. The instructions 524 may provide source code and/or data code to the processor 502 to enable any one or more operations disclosed herein.

Figure 6A:
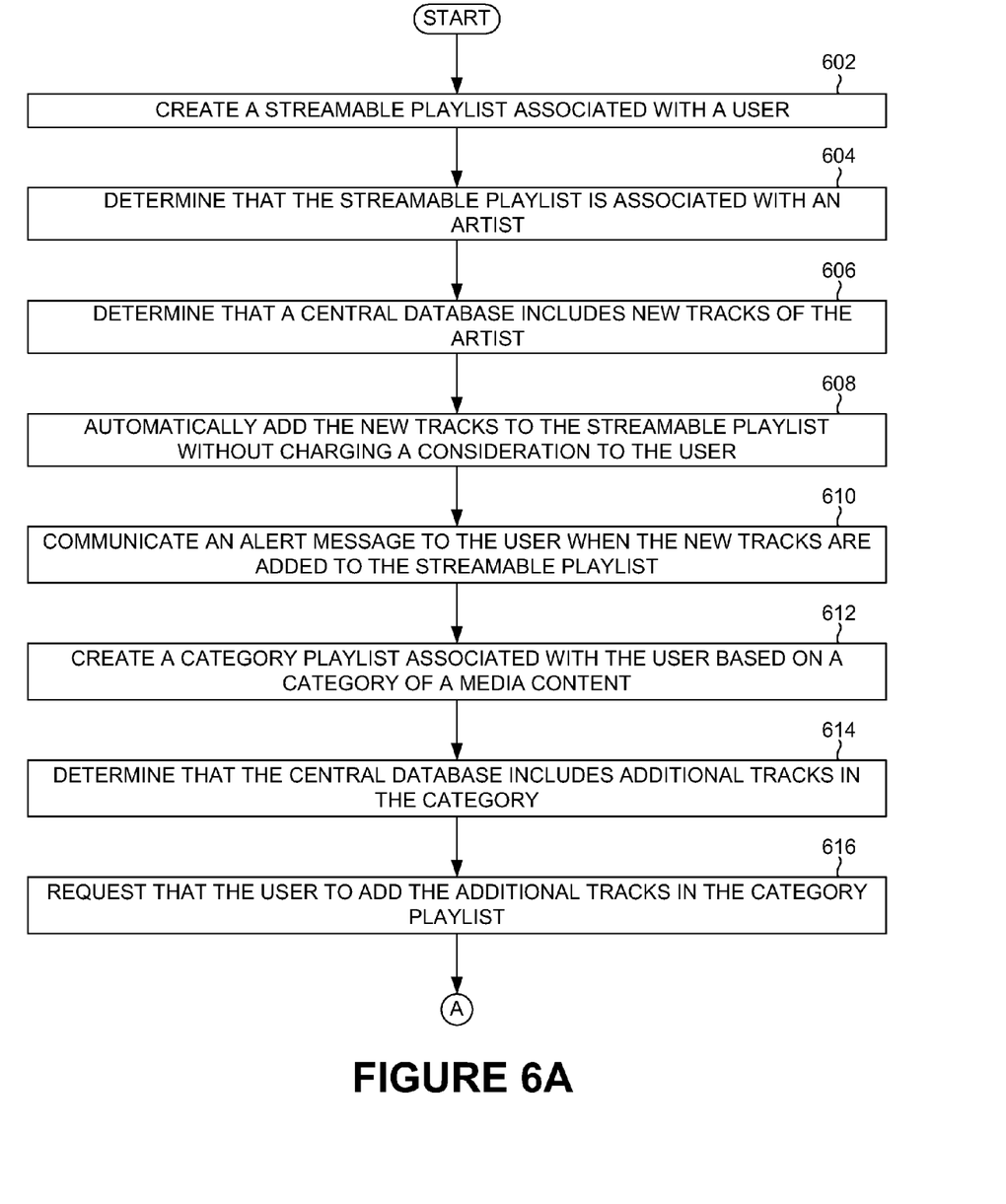
FIG. 6A is a process flow of adding additional tracks to category playlist based on a user response, according to one embodiment.

FIG. 6A is a process flow of adding additional tracks to category playlist based on a user response, according to one embodiment. In operation 602, a streamable playlist may be created (e.g., using the create module 206 of FIG. 1) associated with a user (e.g., the user 108 of FIG. 1). In operation 604, it may be determined (e.g., using the determine module 208 of FIG. 2) that the streamable playlist is associated with an artist. In operation 606, it may be determined (e.g., using the determine module 208 of FIG. 2) that a central database includes new tracks of the artist.

In operation 608, the new tracks may be automatically added (e.g., using the add/remove module 114 of FIG. 1) to the streamable playlist without charging a consideration (e.g., credit, money, etc.) to the user 108. The streamable playlist may be created (e.g., using the create module 206 of FIG. 2) of a media content (e.g., the media content 116 of FIG. 1) that may be stored on a content database (e.g., the content database 118 of FIG. 1) of a central server (e.g., the central server 102 of FIG. 1).

In operation 610, an alert message may be communicated (e.g., using the communication module 202 of FIG. 2) to the user 108 when the new tracks are added to the streamable playlist. In operation 612, a category playlist may be created (e.g., using the create module 206 of FIG. 2) associated with the user 108 based on a category of a media content (e.g., the media content 116 of FIG. 1). In operation 614, it may be determined (e.g., using the determine module 208 of FIG. 2) that the central database includes additional tracks in the category. In operation 616, the user 108 may be requested (e.g., using the request module 210 of FIG. 2) to add the additional tracks in the category playlist (e.g., as illustrated in FIG. 3).

Figure 6B:
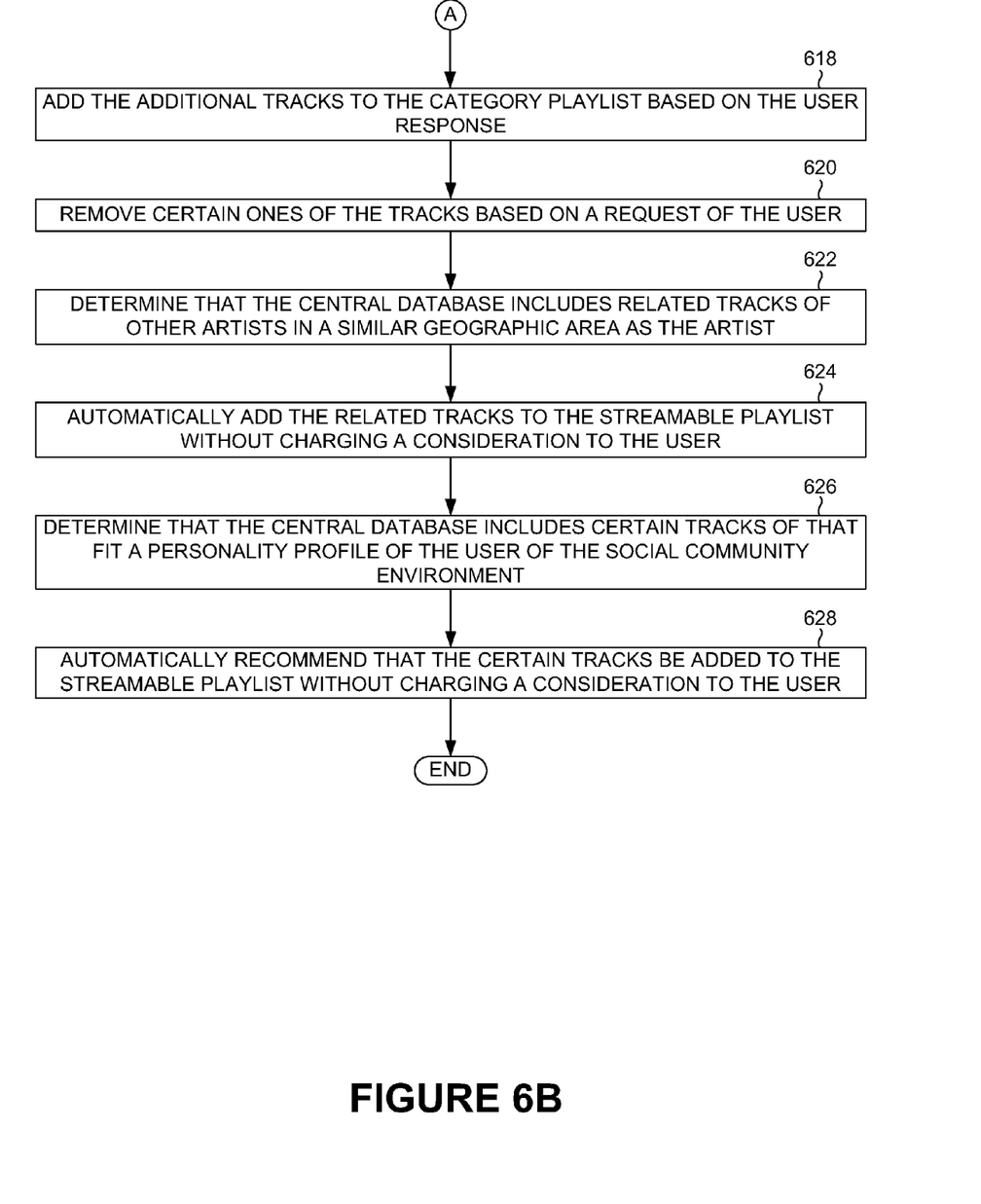
FIG. 6B is a continuation of process flow of FIG. 6A, illustrating additional operations, according to one embodiment.

FIG. 6B is a continuation of process flow of FIG. 6A, illustrating additional operations, according to one embodiment. In operation 618, the additional tracks may be added (e.g., using the add/remove module 114 of FIG. 1) to the category playlist based on a user response. The streamable playlist may not be downloaded to a client device (e.g., the client device 106 of FIG. 1) associated with the user 108 before the consideration is received from the user 108.

The streamable playlist may be playable as a ringtone on a mobile device. The streamable playlist may be created (e.g., using the create module 206 of FIG. 2) when the user 108 selects a subscribe indicator (e.g., using the subscribe module 112 of FIG. 2) on a website associated with the artist. The subscribe indicator may be located on any website having textual data referencing the artist. The website may be a fan page of the artist, a blog page, and/or an artist website, etc.

In operation 620, certain ones of the tracks based on a request of the user may be removed (e.g., using the add/remove module 114 of FIG. 1). In operation 622, it may be determined (e.g., using the determine module 208 of FIG. 2) that the central database includes related tracks of other artists in a similar geographic area as the artist. In operation 624, the related tracks may be automatically added (e.g., using the add/remove module 114 of FIG. 1) to the streamable playlist without charging a consideration (e.g., credit, money, etc.) to the user 108.

In operation 626, it may be determined (e.g., using the determine module 208 of FIG. 2) that the central database includes certain tracks of that may fit a personality profile (e.g., as illustrated in FIG. 3) of the user of the social community environment. In operation 628, the certain tracks may be automatically recommended (e.g., using the recommendations option as illustrated in FIG. 3) be added to the streamable playlist without charging a consideration to the user.

Figure 7:
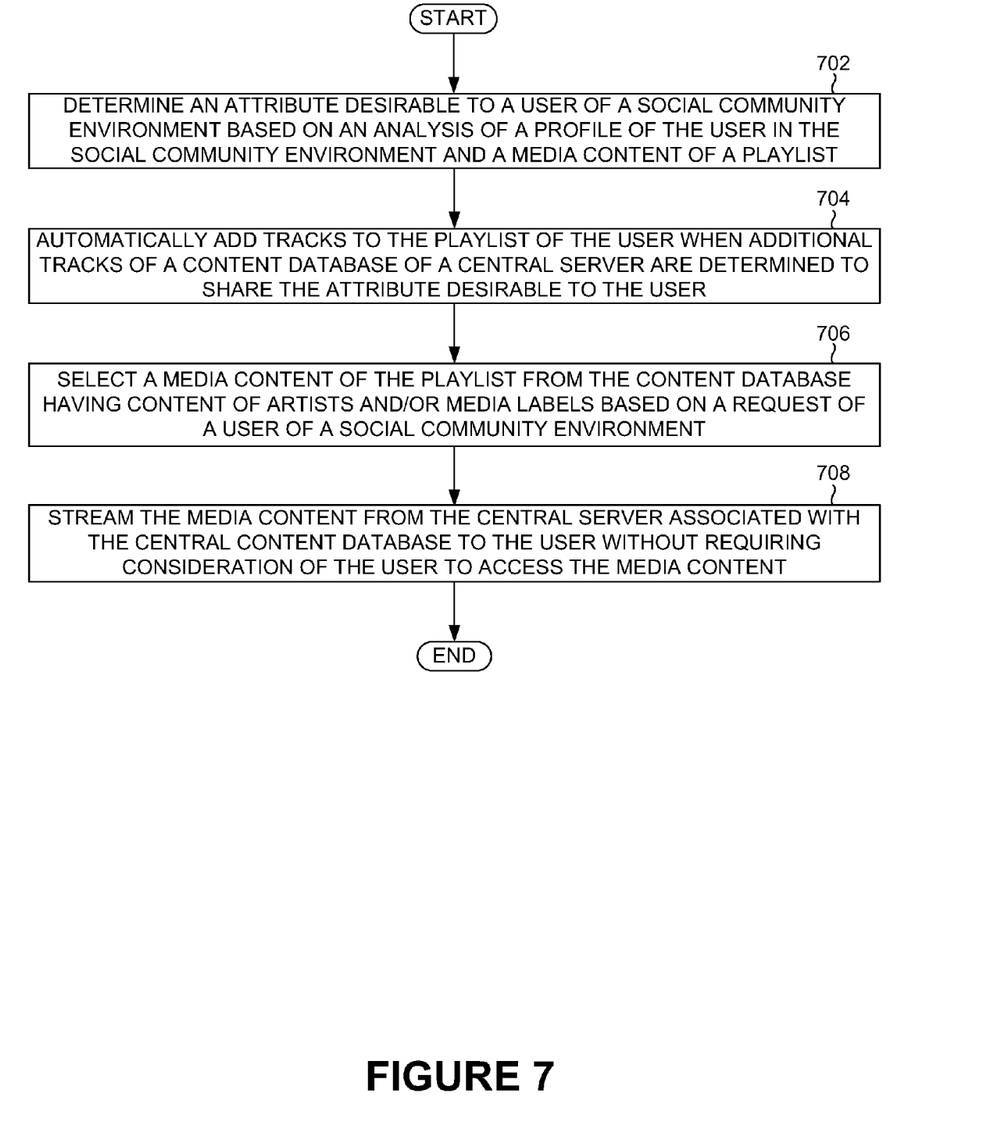
FIG. 7 is a process flow of streaming the media content from central server associated with the central content database to the user, according to one embodiment.

FIG. 7 is a process flow of streaming the media content from central server associated with the central content database to the user, according to one embodiment. In operation 702, an attribute may be determined desirable to a user (e.g., the user 108 of FIG. 1) of a social community environment (e.g., social community environment 120 of FIG. 1) based on an analysis of a profile of the user 108 (e.g., using the profile analyzer module 204 of FIG. 2) in the social community environment 120 and/or a media content (e.g., the media content 116 of FIG. 1) of a playlist.

In operation 704, tracks may be automatically added (e.g., using the add/remove module 114 of FIG. 1) to the playlist of the user 108 when additional tracks of a content database (e.g., the content database 118 of FIG. 1) of a central server (e.g., the central server 102 of FIG. 1) may be determined (e.g., using the determine module 208 of FIG. 2) to share the attribute desirable to the user 108. The attribute may be selected from a personal attribute of the user 108, an artist name, an album name, a track name, a genre, a category, and/or a geographical area, etc.

In operation 706, a media content (e.g., the media content 116 of FIG. 1) of the playlist may be selected from the content database 118 having content of artists and/or media labels based on a request of a user (e.g., using the request module 210 of FIG. 2) of the social community environment 120. In operation 708, the media content 116 may be streamed (e.g., using the streaming module 122 of FIG. 1) from the central server 102 associated with the central content database to the user 108 without requiring consideration of the user 108 to access the media content 116.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., Application Specific Integrated Circuitry (ASIC) and/or in Digital Signal Processor (DSP) circuitry).

For example, the subscribe module 112, the add/remove module 114, the communication module 202, the profile analyzer module 204, the create module 206, the determine module 208, the request module 210, the geography module 212, and the message module 214 of FIG. 1-7 may be enabled using software and/or using transistors, logic gates, and electrical circuits (e.g., application specific integrated ASIC circuitry) such as a subscribe circuit, an add/remove circuit, a communication circuit, a profile analyzer circuit, ac create circuit, a determine circuit, a request circuit, a geography circuit, and a message circuit, and other circuits.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method, comprising:

creating, through a server device, a streamable playlist upon user selection of a subscribe indicator presented on a website in association with at least one of an artist, an album, a genre, or a category, the streamable playlist being created using a media content stored in a content database of a central server, and the streamable playlist being associated with a user of a client device coupled to the server device through a network;

determining, through the server device, that an artist is part of the streamable playlist;

automatically adding, through the server device, at least one of: (i) information of a new track of the artist or (ii) the new track, to the streamable playlist associated with the user of the client device upon availability of the new track in the content database, without requiring the user to specifically subscribe to the automatic adding of information or a new track and without a requirement of setting at least one condition and at least one filter criteria with regard to the streamable playlist, the content database having a plurality of media content associated with different artists including the artist that is part of the streamable playlist stored therein; and streaming the media content included in the streamable playlist directly from the central server without a requirement of the user to access the media content through the client device associated therewith.

2. The method of claim 1, further comprising alerting, through the server device, the user when the new track is added to the streamable playlist.

3. The method of claim 1, further comprising:
creating the streamable playlist as a category playlist associated with the user based on a category of the media content, the subscribe indicator being presented on the website in association with the category;
after creating the category playlist, determining that the content database includes an additional track in the category used to create the playlist; and
adding the additional track to the category playlist based on an appropriate response from the user.

4. The method of claim 1, further comprising enabling, through the server device, removal of the new track based an appropriate request from the user.

5. The method of claim 1, comprising enabling playing of the streamable playlist as a ringtone on a mobile device.

6. The method of claim 1, wherein the subscribe indicator is presented on the website in association with the artist.

7. The method of claim 6, wherein the website is at least one of a fan page of the artist, a blog page associated with the artist, or an artist website.

8. The method of claim 1, further comprising:
determining that the content database includes a related track of another artist related to the artist through a parameter; and
automatically adding the related track to the streamable playlist.

9. The method of claim 1, further comprising:
determining that the content database includes a track that fits a personality profile of the user when the user is in a social community environment; and
automatically recommending that the track fitting the personality profile of the user be added to the streamable playlist.

10. A server device comprising:
a memory; and
a processor communicatively coupled to the memory, the processor being configured to execute instructions associated with:
creating a streamable playlist upon user selection of a subscribe indicator presented on a website in association with at least one of an artist, an album, a genre, or a category, the streamable playlist being created using a media content stored in a content database of a central server, and the streamable playlist being associated with a user of a client device coupled to the server device through a network,
determining that an artist is part of the streamable playlist,
automatically adding at least one of: (i) information of a new track of the artist or (ii) the new track, to the streamable playlist associated with the user of the client device upon availability of the new track in the content database, without requiring the user to specifically subscribe to the automatic adding of information or a new track and without a requirement of setting at least one condition and at least one filter criteria with regard to the streamable playlist, the content database having a plurality of media content associated with different artists including the artist that is part of the streamable playlist stored therein, and
streaming the media content included in the streamable playlist directly from the central server without a requirement of the user to access the media content through the client device associated therewith.

11. The server device of claim 10, wherein the processor is further configured to execute instructions associated with enabling removal of the new track based an appropriate request from the user.

12. The server device of claim 10, wherein the processor is further configured to execute instructions associated with:
determining that the content database includes a related track of another artist related to the artist through a parameter, and
automatically adding the related track to the streamable playlist.

13. The server device of claim 10, wherein the processor is further configured to execute instructions associated with:
determining that the content database includes a track that fits a personality profile of the user when the user is in a social community environment, and
automatically recommending that the track fitting the personality profile of the user be added to the streamable playlist.

14. A system comprising:
a central server having a plurality of media content associated with different artists stored in a content database associated therewith;
a network;
a client device; and
a server device configured to communicate with the client device through the network and to:
create a streamable playlist upon user selection of a subscribe indicator presented on a website in association with at least one of an artist, an album, a genre, or a category, the streamable playlist being created using a media content of the plurality of media content, and the streamable playlist being associated with a user of the client device,
determine that an artist of the different artists is part of the streamable playlist, and
automatically add at least one of: (i) information of a new track of the artist or (ii) the new track, to the streamable playlist associated with the user of the client device upon availability of the new track in the content database, without requiring the user to specifically subscribe to the automatic adding of information or a new track and without a requirement of setting at least one condition and at least one filter criteria with regard to the streamable playlist, and
stream the media content included in the streamable playlist directly from the central server without a requirement of the user to access the media content through the client device associated therewith.

15. The system of claim 14, wherein the server device is further configured to enable removal of the new track based an appropriate request from the user.

16. The system of claim 14, wherein the server device is further configured to:
determine that the content database includes a related track of another artist related to the artist through a parameter, and
automatically add the related track to the streamable playlist.

17. The system of claim 14, wherein the server device is further configured to:

determine that the content database includes a track that fits a personality profile of the user when the user is in a social community environment, and automatically recommend that the track fitting the personality profile of the user be added to the streamable playlist.

* * * * *